United States Patent
Chen et al.

(10) Patent No.: US 10,237,722 B2
(45) Date of Patent: Mar. 19, 2019

(54) SYSTEM AND METHOD FOR MULTI-SIM PROFILES OR EMBEDDED SIM

(71) Applicant: Futurewei Technologies, Inc., Plano, TX (US)

(72) Inventors: Jian Chen, Plano, TX (US); Lei Li, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/066,540

(22) Filed: Mar. 10, 2016

(65) Prior Publication Data

US 2016/0269891 A1    Sep. 15, 2016

Related U.S. Application Data

(60) Provisional application No. 62/131,704, filed on Mar. 11, 2015.

(51) Int. Cl.
*H04W 8/18* (2009.01)
*H04W 76/18* (2018.01)
*H04L 29/06* (2006.01)

(52) U.S. Cl.
CPC .......... *H04W 8/183* (2013.01); *H04L 63/0853* (2013.01); *H04L 63/102* (2013.01); *H04W 76/18* (2018.02)

(58) Field of Classification Search
CPC ............. H04W 12/06; H04W 52/0254; H04W 52/0274; H04W 88/02; H04W 8/18; H04W 12/08; H04W 36/0022; H04W 48/18; H04W 12/02; H04W 36/0072; H04W 4/02; H04W 4/24; H04W 76/02; H04W 76/022; H04W 80/00
See application file for complete search history.

(56) References Cited

U.S. PATENT DOCUMENTS

| | | | |
|---|---|---|---|
| 2012/0100832 A1* | 4/2012 | Mao | H04W 12/06 455/411 |
| 2013/0023235 A1* | 1/2013 | Fan | H04W 48/18 455/411 |
| 2014/0148130 A1* | 5/2014 | Rathus | H04M 1/274516 455/411 |
| 2015/0056960 A1* | 2/2015 | Egner | H04W 12/08 455/411 |
| 2015/0215844 A1* | 7/2015 | Davis | H04W 8/183 455/432.1 |
| 2015/0229471 A1* | 8/2015 | Nair | H04L 9/0822 713/171 |

(Continued)

*Primary Examiner* — George Eng
*Assistant Examiner* — Jing Gao
(74) *Attorney, Agent, or Firm* — Slater Matsil, LLP

(57) ABSTRACT

Methods and apparatuses that select initial subscriber information module (SIM) profile via a mobile device are described. Multiple SIM profiles including a first SIM profile and a second SIM profile can be stored on a SIM card for the mobile device. The mobile device may attempt to connect to a first network via the first SIM profile. In response to a failure to connect to the first network according to the first SIM profile, the mobile device can access the second SIM profile to connect to a second network according to the second SIM profile. In an embodiment, this logic continues to the next SIM profiles stored on the SIM card for the mobile device until it is successfully connected to a network.

20 Claims, 12 Drawing Sheets

(56) References Cited

U.S. PATENT DOCUMENTS

2015/0304506 A1* 10/2015 Zhu .................. H04M 15/49
455/406
2015/0334584 A1* 11/2015 Sun .................. H04W 24/02
455/67.11

* cited by examiner

SYSTEM AND METHOD FOR MULTI-SIM PROFILES OR EMBEDDED SIM

CROSS-REFERENCE

This application is related to, and claims the benefits of, U.S. Provisional Patent Application No. 62/131,704, filed on Mar. 11, 2015, entitled "System and Method for Multi-SIM Profiles or Embedded SIM", Jian Chen et al. which is hereby incorporated by reference herein in its entirety.

TECHNICAL FIELD

The present invention relates to wireless communications, and, in particular embodiments, to a system and method for multi-subscriber information module (SIM) profiles or embedded SIM.

BACKGROUND

As discussed in [1], a dual SIM mobile phone is similar to a single SIM phone but with the addition of a second transceiver that allows the mobile phone to implement two separate SIMs. A SIM is a small chip or card that slides into the back of a mobile phone and guides pick up of cellular signals. A SIM generally is programmed to pick up the signal from a particular mobile network, receiving signals from that network's cellular towers. Because of mobile phones many features and capabilities, mobile subscribers are using more SIMs from multiple operators. A dual SIM card allows a mobile phone to have two SIM cards for using two different service providers' services.

SUMMARY

An embodiment method for initial subscriber information module (SIM) profile selection includes a mobile device accessing a first SIM profile stored on a SIM card for the mobile device, and attempting to connect to a first network according to the first SIM profile. In response to the attempting to connect to the first device failing, the mobile devices accesses a second SIM profile stored on the SIM card for the mobile device, and attempts to connect to a second network according to the second SIM profile. In an embodiment, this logic continues to the next SIM profiles stored on the SIM card for the mobile device until it is successfully connected to a network.

An embodiment mobile device includes a processor, a non-transitory computer readable storage medium storing programming for execution by the processor, and a subscriber information module (SIM) card operatively coupled to the processor, where the SIM card stores multiple SIM profiles for different network service providers.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
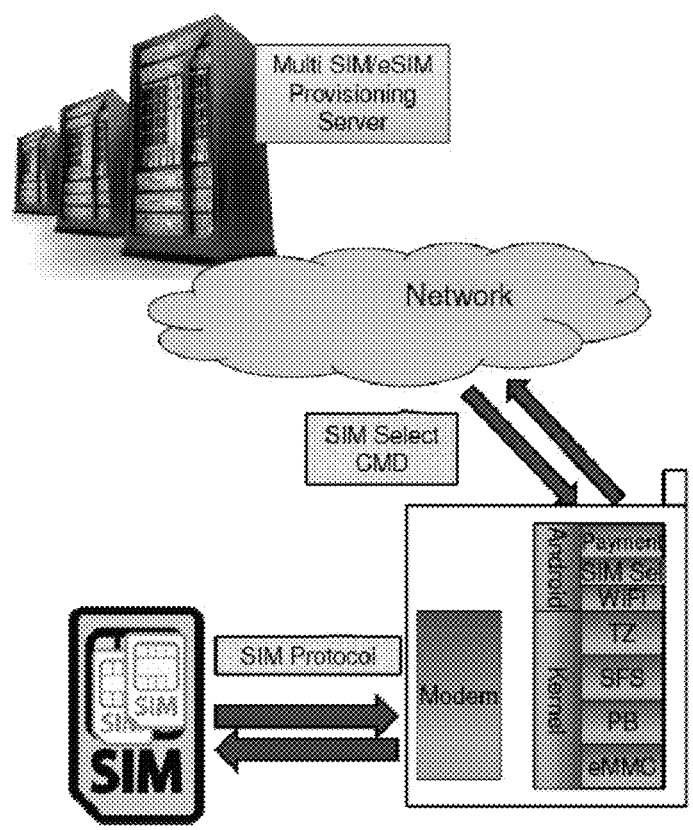
FIG. 1 illustrates a multi-SIM profile solution.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment deploys multiple SIM profiles on one SIM card for different network service providers. An embodiment uses cloud technology over the air (OTA) to push SIM profile selection instruction to a device. A device can be instructed by the OTA server to switch the wireless carrier from one to another electronically. An embodiment simplifies an mobile virtual network operator (MVNO) end user switch carrier seamlessly.

An embodiment provides auto selection from the order of SIM profiles. In an embodiment, automatic SIM profile selection at the condition of no service is available at the first preset SIM profile. In an embodiment, at initial service establishment, when is no service, the device automatically switches to the next available SIM profile and re-establishes the service. This logic and the steps will continue till a service is established. An embodiment establishes the initial wireless service smoothly under no service condition.

With respect to initial SIM profile selection, multiple SIM profiles are stored on one SIM card in a preset order. When the mobile device powers up the first time out of the box, there is no service, or a network connection is established. The device works with the network to set the connection using information on the SIM profile. In an embodiment, the first SIM profile in the preset order is triggered for registration/authentication/service confirmation. After it succeeds, there is network coverage, and the phone is powered up as normal and goes into idle state ready for use.

If the location does not have coverage for the network for which the first SIM profile is defined, the phone goes to no service and is dead. There is not a chance to select other SIM profiles in this case, because there is no connection to the SIM selection server. Automatic SIM profile selection automatically switches to the next SIM profile on the SIM card and tries the registration/authentication/service confirmation process on other network which is defined by the switched SIM profile. This process will continue until it gets a connection.

An embodiment provides dynamic switching of MNOs. For a mobile virtual network operator (MVNO), one MVNO may use multiple mobile network operators (MNOs or carriers). An MVNO customer may request to switch a carrier for any reason other than MVNO originally assigned. The change carrier/MNO is a very inconvenient and costly process today, involving phone calls, SIM card delivery, and an activation process. Furthermore, the planning work for SIM card allocation is difficult and inaccurate. An MVNO assigns an MNO to a particular device based on an assumption that an end user is going to use the phone service near the location the retail store located where the device is sold. This is a very broad assumption and the reality can be very different from this assumption. If an end user situation is not within this assumption, an MVNO may have an unhappy customer. The MVNO needs to deal with the carrier change request.

Dynamic switch of MNO performs the carrier change in the background without service interruption and appears as a smooth process to both the end user and MVNO. Embodiments are applicable to both multi-SIM profiles and embedded SIM.

An embodiment provides TxRx dual encoding security for securing OTA transmission. Carrier selection is an important decision for the MVNO and MNO. The carrier total subscriber base is changed by every carrier selection decision. There is a great deal of interest to gain a subscriber and entities are willing to pay a fee for it. That opens the door for a hacker to get into this field and alter the selection decision. To prevent the unauthorized behavior via intercept, replace, fake a command over the air, on the device, this technology requires tight security protection from both device and server. The device (RX from getting command from the server point of view) issues a device unique signature to be sent to the server. The Server (TX from pushing command to device point of view) encrypts the command together with the received device signature and sends the encrypted message to the device for the device to decrypt.

An embodiment provides an encryption algorithm for the server to encrypt the command content and an associated decryption algorithm for the device to decrypt the received content. The OTA command for SIM profile selection is secured from hacking, replacement. An embodiment securely protects the OTA instruction from unauthorized replacement.

An embodiment provides an integrated contact list/phone book that combines the phone book on the SIM card and the contacts on the device into one database on the device, and backs it up on the server.

An embodiment provides multiple SIM profiles in device native memory, such as flash memory, rather than on a SIM card. By doing this, the SIM card is eliminated altogether.

FIG. 1 illustrates a multi-SIM profile solution. Multi-SIM allows multiple SIM profiles on one SIM. Embedded SIM (eSIM) allows multiple SIM profiles on a device. Multi-SIM and eSIM generally provide flexible carrier selection, eliminate SIM type management, SIM inventory hassle, and SIM kitting hassle.

For a mobile virtual network operator (MVNO), when an end user-initiated carrier change request is received, the MVNO involves customer service and physically mails a different SIM card to the end user. The multi SIM profile embodiment and an eSIM embodiment make this change automatic and seamless to an end user.

For an MVNO, it is difficult to perform an MVNO initiated carrier switch. Once a device is sealed at the kitting production line, the device is bound to a particular carrier with a physical SIM card. The multi SIM profile embodiment and an embodiment eSIM makes MVNO switch of an end user carrier seamless and electronic.

The encryption/decryption algorithm for contents between the device terminal and the SIM provisioning server prevents from the contents get replaced.

Figure 2:
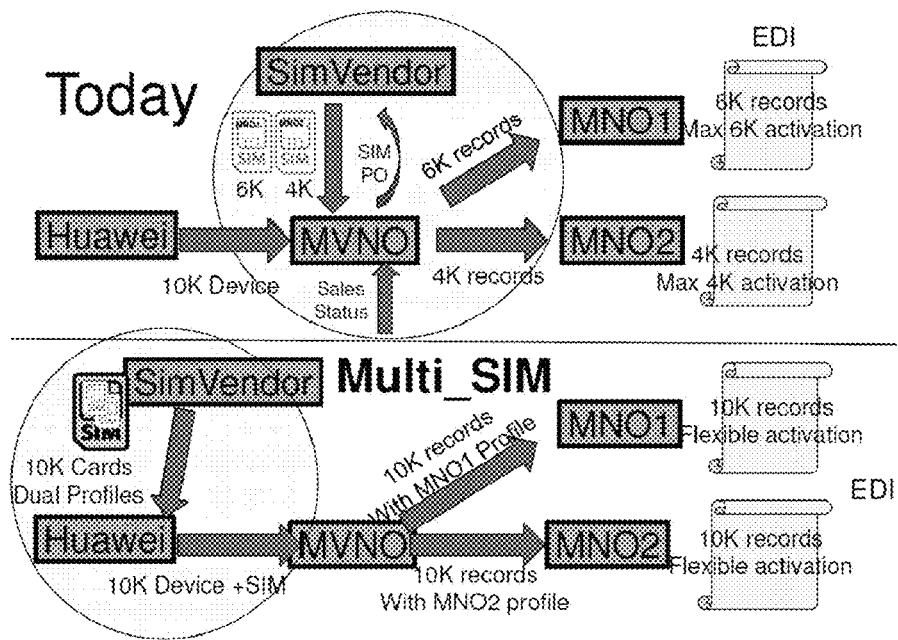
FIG. 2 illustrates a multi-SIM card logistic and EDI system.

FIG. 2 illustrates a multi-SIM card logistic and EDI system. For SIM card management, a company may purchase SIM cards and manage inventory. The eSIM provisional server controls the SIM profile selection. An OEM installs a SIM card, and the device is assembled with SIM, battery and cover. Options for initial SIM selection include using a WiFi channel for a SIM selection command, using a default bootstrap on the SIM card, and using a fixed order on multiple SIM profiles. An integrated phone book may be used regardless of which SIM profile is engaged, for added user value. Over the air (OTA) security encryption may be provided. Further, these three methods are just examples. There are methods for sending the SIM selection command to the device, including Blue Tooth, SD card, USB tethered line, and the like.

Figure 3:
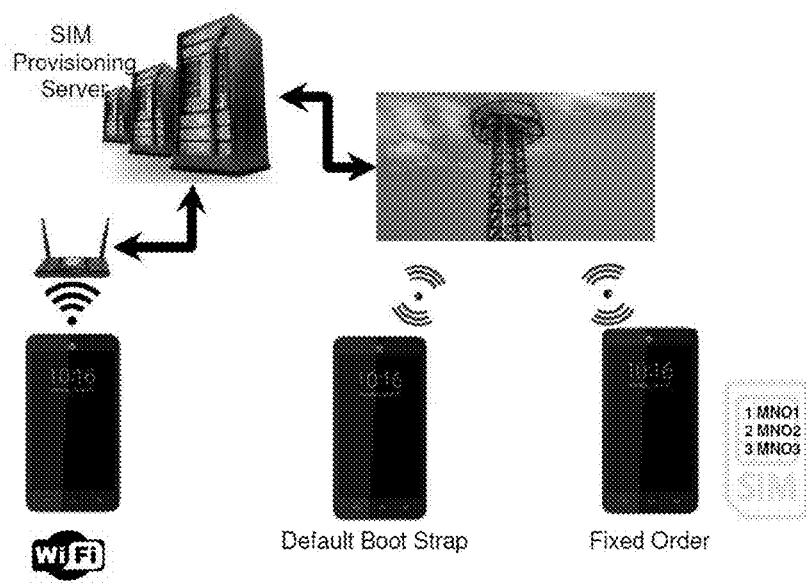
FIG. 3 illustrates initial SIM selection options.

FIG. 3 illustrates three initial SIM profile selection options. The first option for SIM profile selection is initiated by WiFi. A Wifi connection is established between the mobile phone and the SIM provisioning server for service provider selection. An MVNO makes a decision and sends the SIM profile selection command to the device, and the network connection will be established to that network.

The second option for SIM profile selection is initiated by default boot strap. For example, the default service provider is set to MNO1, then MNO1 activates the SIM by default and sends signal(s) to the provisioning server. If the customer wants a different service such as MNO2's service, the customer selects MNO2 from the application in the mobile phone. The SIM provisioning server receives the request and then sets up MNO's service and cuts off MNO1's service.

The third option for SIM profile selection is initiated by a fixed order SIM profile. For example, the order of the SIM profile is set as first MNO1, second MNO2, third MNO3, etc. The mobile connection will try MNO1 first. If that fails, it will try MNO2. If that also fails, it will try MNO3, and so on, until the MNO that the customer selected is tried and connected.

Figure 4:
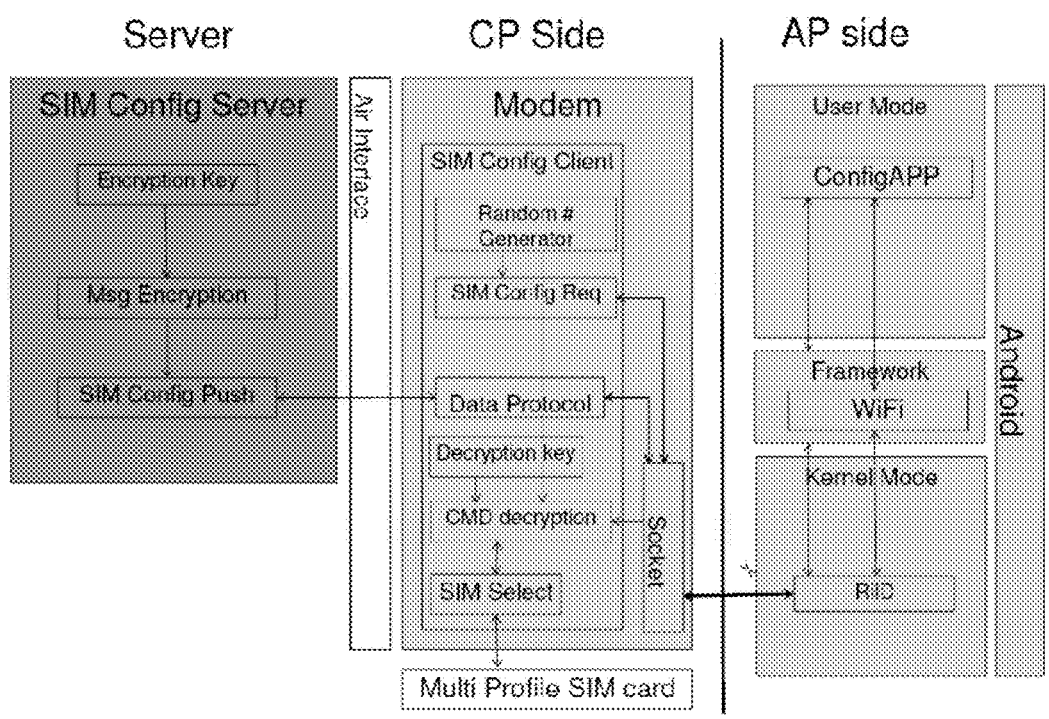
FIG. 4 illustrates a multi-SIM architecture for WiFi and default bootstrap options.

FIG. 4 illustrates a multi-SIM architecture for WiFi and default bootstrap options.

Figure 5:
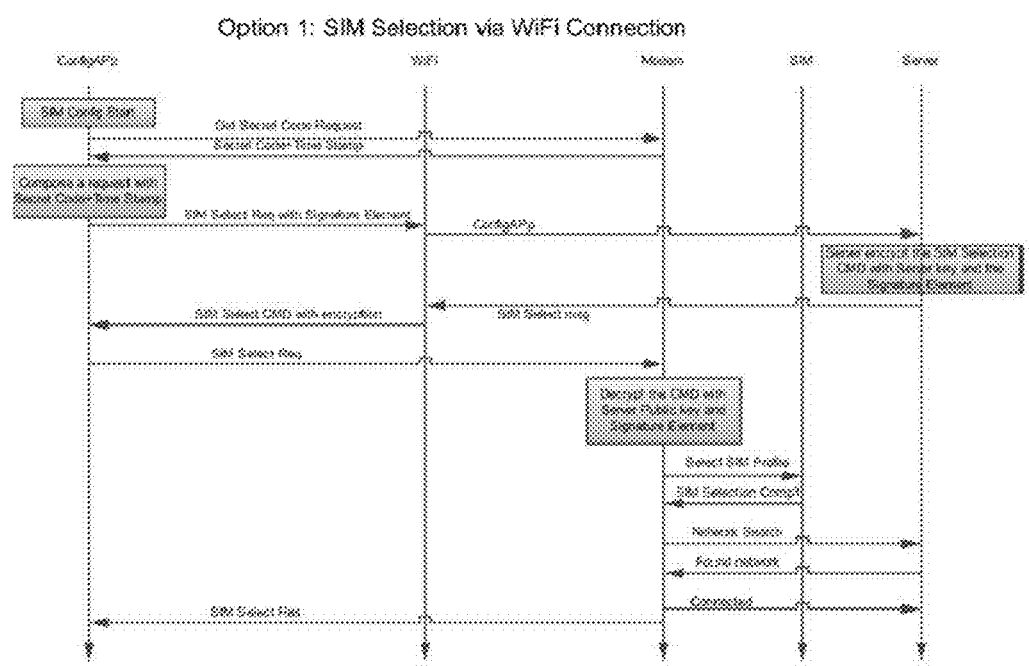
FIG. 5 illustrates SIM selection via WiFi connection option.

FIG. 5 illustrates SIM selection via WiFi connection option. A WiFi channel is used as the initial connection for SIM selection command push to the device. This option uses native WiFi data connection capability to set up a communication channel between the device and the server. This option is stand alone and does not need to ask others for assistance. No device-SIM security encryption needed, and one type of SIM covers all mobile network operators (MNOs). WiFi connection is not available everywhere, however, and the user needs to make sure WiFi is working first before SIM selection can proceed.

Figure 6:
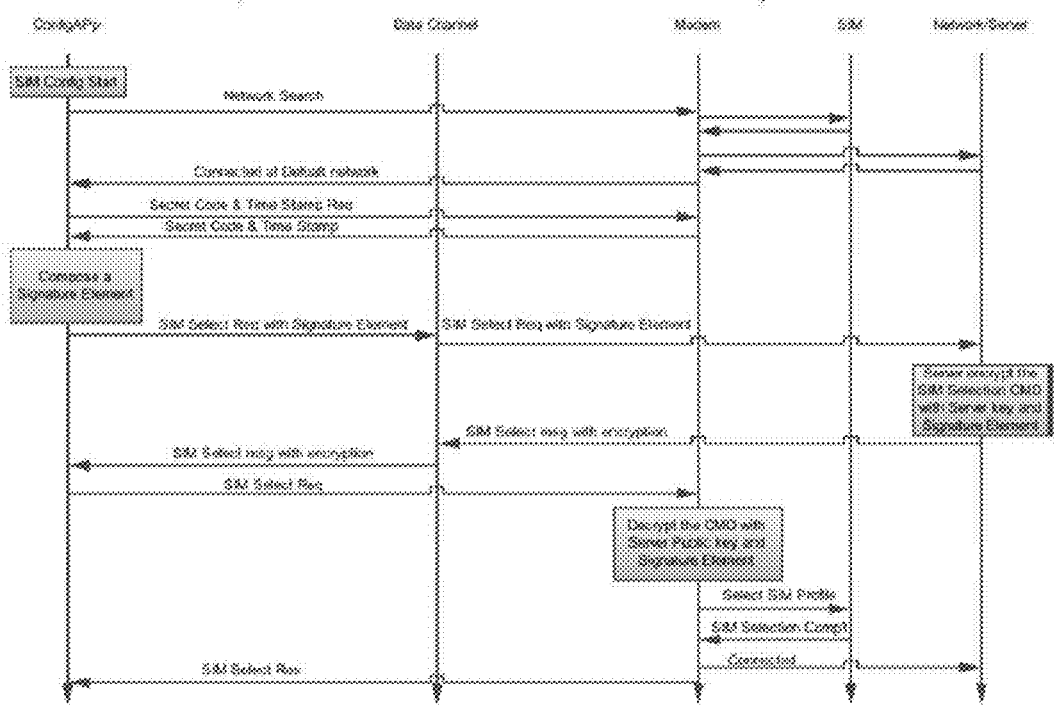
FIG. 6 illustrates SIM selection via a default bootstrap on SIM option.

FIG. 6 illustrates SIM selection via a default bootstrap on SIM option. This option provides a smooth user experience, one type of SIM covers all MNOs, and no device-SIM security encryption needed. However, an MNO needs to agree to lend its network as the pilot connection for the SIM select command push.

Figure 7:
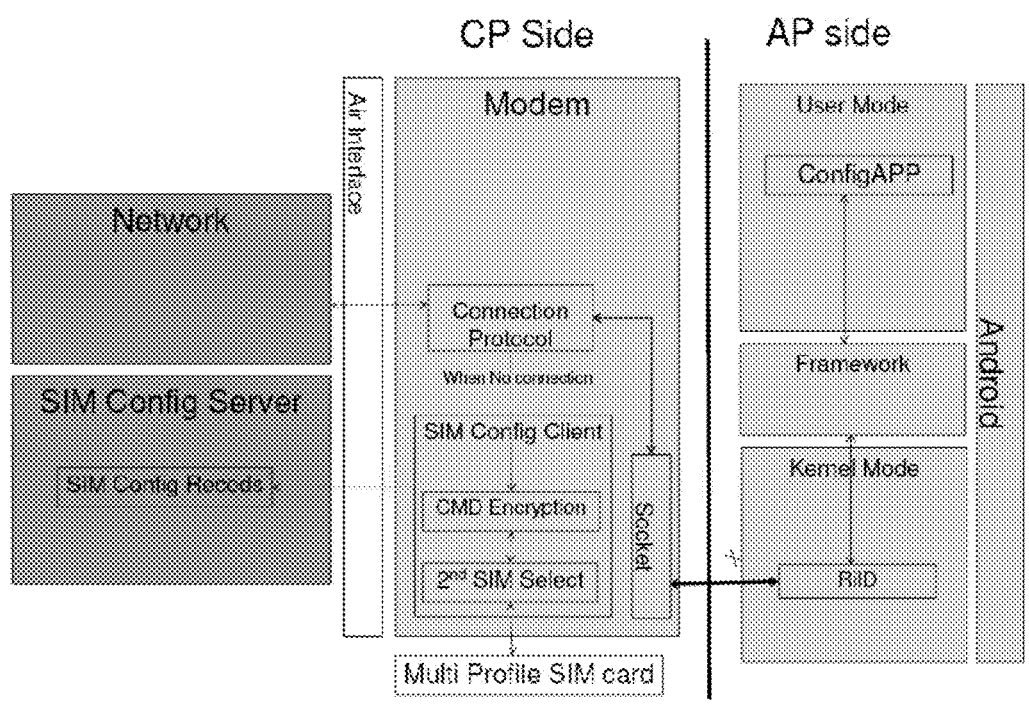
FIG. 7 illustrates a multi-SIM architecture for fixed order options.
Figure 8:
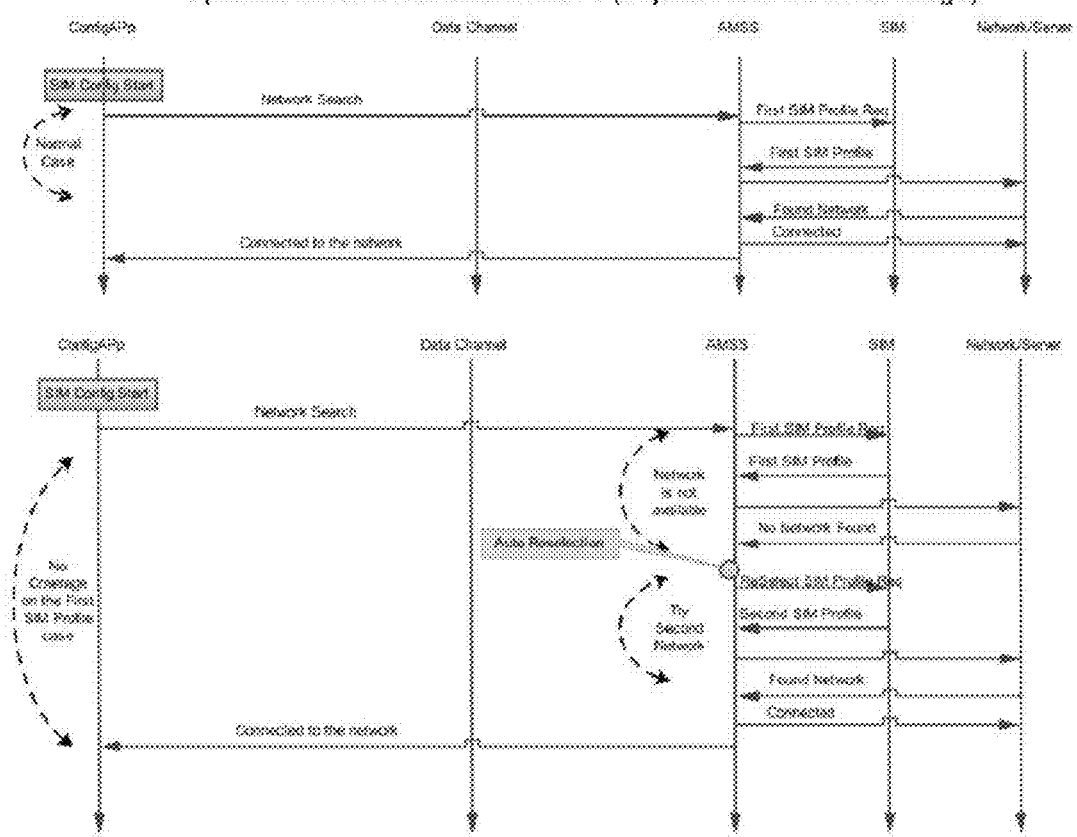
FIG. 8 illustrates a fixed SIM profile option.

FIG. 7 illustrates a multi-SIM architecture for fixed order options. FIG. 8 illustrates a fixed order SIM profile option. Fixed order MNO profiles are on the SIM card. This option is adjustable when there is no coverage on the first choice.

This option provides a smooth user experience, device and server implementations are easier, and there is no need to borrow the MNO network. Device-SIM interface security, however, needs to be co-developed with the SIM vendor, and multiple SIM types will be required based on the default profile orders.

Figure 9:
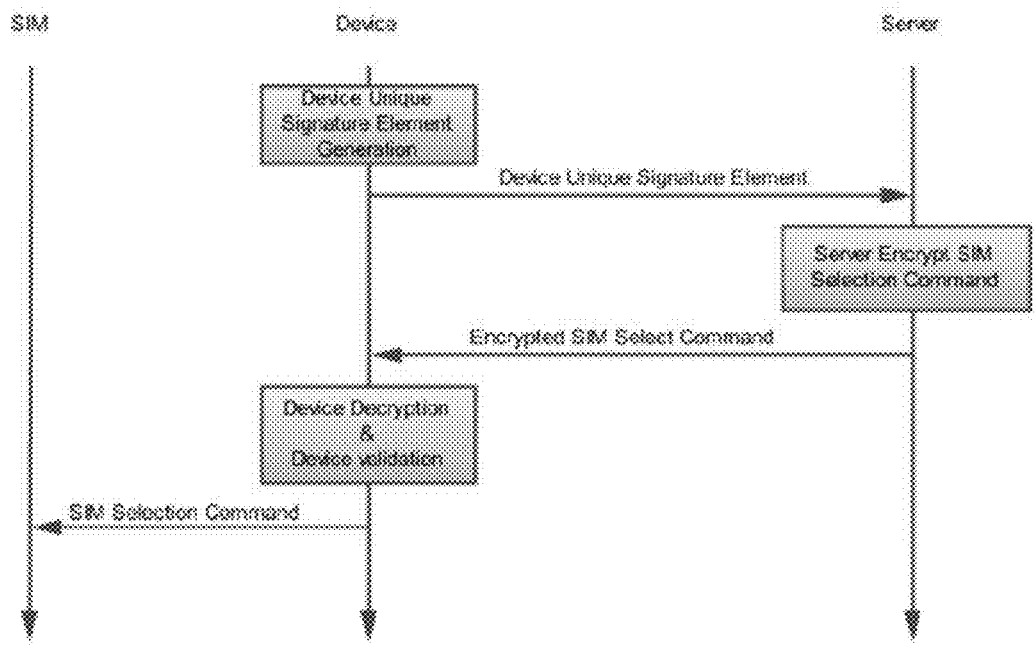
FIG. 9 illustrates an encryption-decryption sequence diagram.
Figure 10:
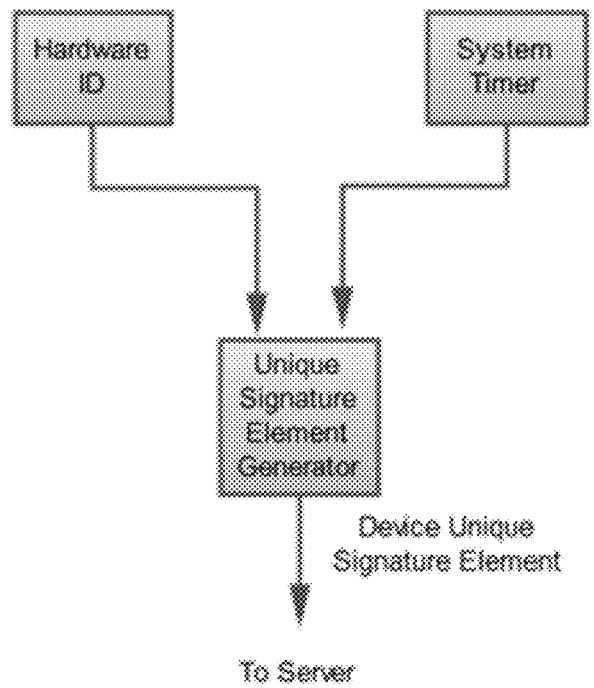
FIG. 10 illustrates device unique signature element generation.
Figure 11:
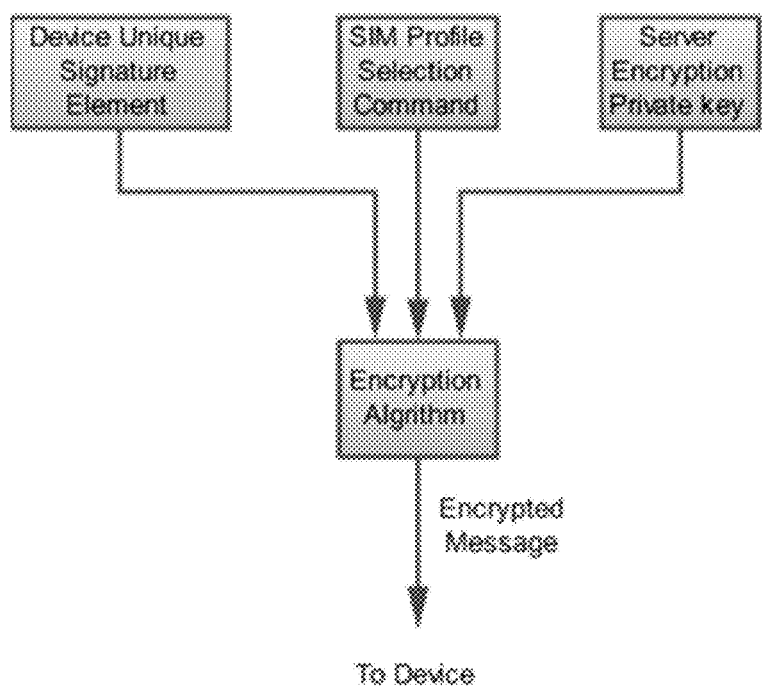
FIG. 11 illustrates server encryption.
Figure 12:
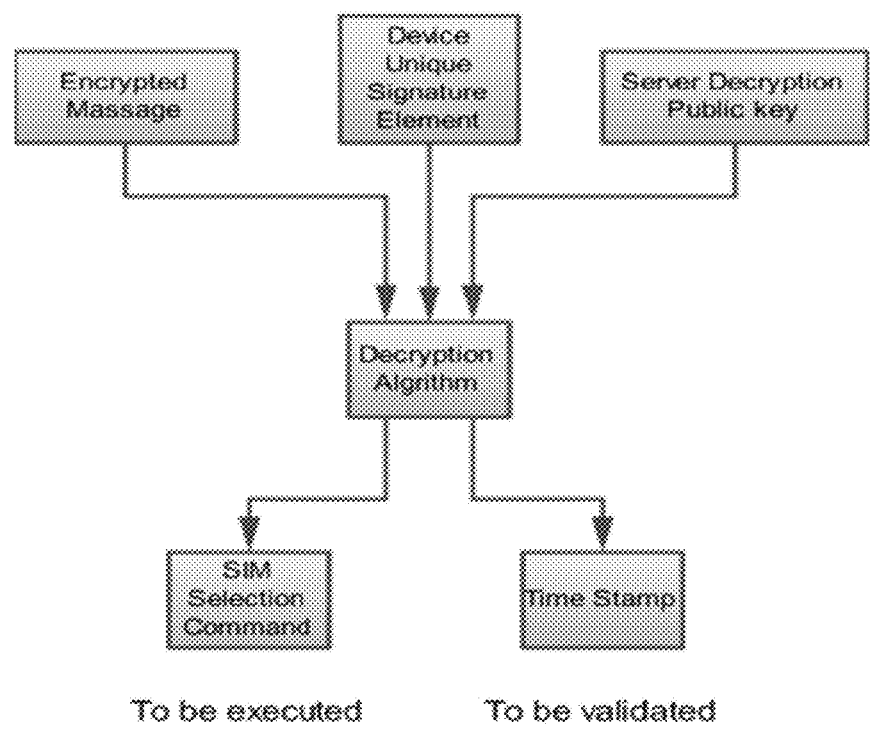
FIG. 12 illustrates device decryption.

In an embodiment providing double encryption, the device send out a device-specific signature element with a device hardware ID, a time stamp as the input to the server, which means only this particular device can generate this element at this time point. This element is used to decrypt the message from the server at a later time. The server receives the element from the device and uses it as an encryption element to encrypt the SIM profile selection command with the server private key, and sends the encrypted message over the air to the device. Once the device receives the message, the device decrypts the message with the server decryption public key and the device-generated unique signature element, verifies the time stamp, and authenticates the device hardware ID to validate the message. FIG. 9 illustrates an encryption-decryption sequence diagram. FIG. 10 illustrates device unique signature element generation. FIG. 11 illustrates server encryption, and FIG. 12 illustrates device decryption.

Figure 13:
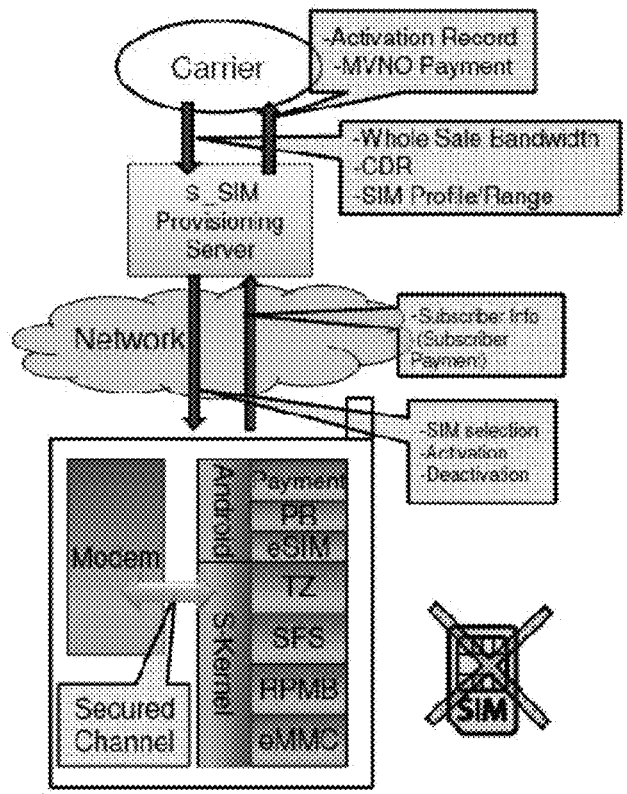
FIG. 13 illustrates an embedded/eco SIM solution.

FIG. 13 illustrates an embedded/eco SIM solution. This option eliminates the SIM card completely. A device can be provisioned with preloaded SIM(s) on the device, or OTA loaded SIM. This option saves on SIM card cost, eliminates SIM card kitting, SIM card management, and SIM card inventory hassle, and is easier for reverse logistic process.

Figure 14:
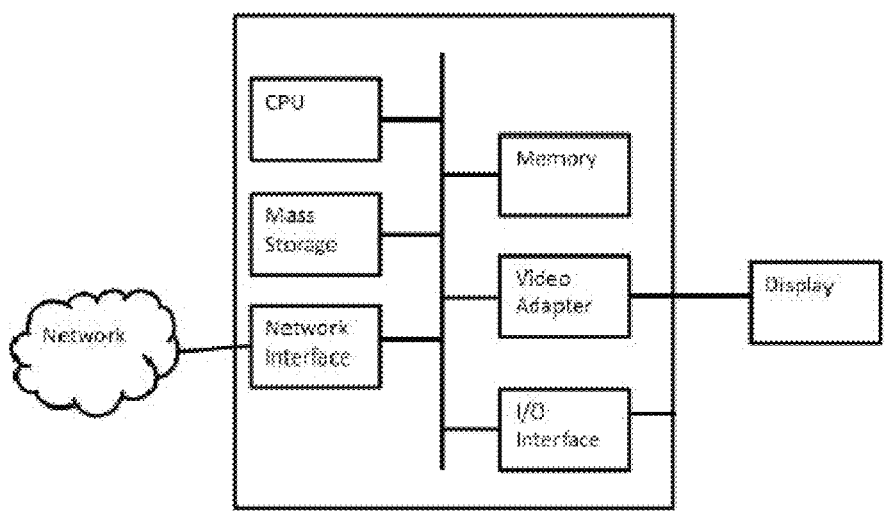
FIG. 14 illustrates a computing platform that may be used for implementing, for example, the devices and methods described herein, in accordance with an embodiment.

FIG. 14 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, touchscreen, keypad, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of non-transitory system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of non-transitory storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, an example of input and output devices include the display coupled to the video adapter. Other devices may be coupled to the processing unit, and additional or fewer interface cards may be utilized. For example, a serial interface such as Universal Serial Bus (USB) (not shown) may be used to provide an interface.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:
[1] N. Mallikharjuna Rao and P. Seetharam, "Multiple Network Operator Services Utilization Using Single SIM Card," International Journal of Computer Theory and Engineering, Vol. 3, No. 3, pp. 408-12, June 2011.
[2] http://www.theverge.com/2012/6/1/3057577/etsi-euicc-embedded-sim-apple; "Embedded SIMs: they're happening, and Apple thinks they could be in consumer products," The Verge, Jun. 1, 2012.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for initial subscriber information module (SIM) profile selection, comprising:
transmitting, by a mobile device to a remote server, a device-specific signature element comprising a random number, the random number generated in accordance with a hardware identifier (ID) of the mobile device and with a time stamp corresponding to a unique point in time;
receiving, by the mobile device from the remote server over the air (OTA), an encrypted message comprising an encryption of a SIM selection command, the encrypted message encrypted in accordance with a key of the remote server and the device-specific signature element;
selecting, by the mobile device, a first SIM profile in accordance with the SIM selection command;
accessing, by the mobile device, the first SIM profile stored on a SIM card of the mobile device, wherein the SIM card is configured to store multiple SIM profiles for different network service providers, wherein the multiple SIM profiles comprise the first SIM profile and a second SIM profile;
transmitting, by the mobile device to a server, a first message to connect to a first network according to the first SIM profile;
receiving, by the mobile device from the server, a second message;
determining, by the mobile device, that a connection to the first network is not successful based on the second message, and based thereon, attempting, by the mobile device, to connect to a second network according to the second SIM profile;

determining, by the mobile device, whether attempting to connect to the second network is successful; and entering, by the mobile device, a powered up idle state, based on determining that attempting to connect to the second network is successful.

2. The method of claim 1, further comprising selecting the second SIM profile using WiFi.

3. The method of claim 1, further comprising selecting the second SIM profile by a default boot strap.

4. The method of claim 1, further comprising selecting the second SIM profile using a fixed order SIM profile list.

5. The method of claim 1, wherein the device-specific signature element comprises the device hardware ID and the time stamp.

6. The method of claim 1, further comprising receiving an over the air (OTA) SIM profile selection instruction for selecting the second SIM profile.

7. The method of claim 1, further comprising backing up, on the server, an integrated phone book containing contacts for the first SIM profile and the second SIM profile.

8. A mobile device comprising:
a subscriber information module (SIM) card, the SIM card storing multiple SIM profiles for different network service providers, wherein the multiple SIM profiles comprise a first SIM profile and a second SIM profile;
a memory storage comprising instructions; and
one or more processors in communication with the memory storage and the SIM card, wherein the one or more processors execute the instructions to:
transmit, to a remote server, a device-specific signature element comprising a random number, the random number generated in accordance with a hardware identifier (ID) of the mobile device and with a time stamp corresponding to a unique point in time;
receive, from the remote server over the air (OTA), an encrypted message comprising an encryption of a SIM selection command, the encrypted message encrypted in accordance with a key of the remote server and the device-specific signature element;
select a first SIM profile in accordance with the SIM selection command;
access the first subscriber information module (SIM) profile;
transmit, to a server, a first message to connect to a first network according to the first SIM profile;
receive, from the server, a second message;
determine that a connection to the first network is not successful based on the second message, and based thereon, attempt, to connect to a second network according to the second SIM profile;
determine whether attempting to connect to the second network is successful; and
enter a powered up idle state, based on determining that attempting to connect to the second network is successful.

9. The mobile device of claim 8, wherein the one or more processors execute the instructions to select the second SIM profile using WiFi.

10. The mobile device of claim 8, wherein the one or more processors execute the instructions further comprise instructions to select the second SIM profile by a default boot strap.

11. The mobile device of claim 8, wherein the one or more processors execute the instructions further comprise instructions to select the second SIM profile using a fixed order SIM profile list.

12. The mobile device of claim 8, wherein the device-specific signature element comprises the device hardware ID and the time stamp.

13. The mobile device of claim 8, wherein the one or more processors execute the instructions further comprise instructions to select the second SIM profile by receiving an over the air (OTA) SIM profile selection instruction.

14. The mobile device of claim 8, wherein the one or more processors execute the instructions further comprise instructions to back up, on the server, an integrated phone book containing contacts for the first SIM profile and the second SIM profile.

15. A method comprising:
transmitting, by a mobile device to a remote server, a device-specific signature element comprising a random number, the random number generated in accordance with a hardware identifier (ID) of the mobile device and with a time stamp corresponding to a unique point in time;
receiving, by the mobile device from the remote server over the air (OTA), an encrypted message comprising an encryption of a SIM selection command, the encrypted message encrypted in accordance with a key of the remote server and the device-specific signature element;
selecting, by the mobile device, a first SIM profile in accordance with the SIM selection command;
accessing, by the mobile device, the first SIM profile stored on a device memory of the mobile device, wherein the device memory is configured to store multiple SIM profiles for different network service providers, wherein the multiple SIM profiles comprise the first SIM profile and a second SIM profile;
transmitting, by the mobile device to a server, a first message to connect to a first network according to the first SIM profile;
receiving, by the mobile device from the server, a second message;
determining, by the mobile device, that a connection to the first network is not successful based on the second message, and based thereon, attempt, to connect to a second network according to the second SIM profile;
determining, by the mobile device, whether attempting to connect to the second network is successful; and
entering, by the mobile device, a powered up idle state, based on determining that attempting to connect to the second network is successful.

16. The method of claim 15, further comprising selecting the second SIM profile using WiFi.

17. The method of claim 15, further comprising selecting the second SIM profile by a default boot strap.

18. The method of claim 15, further comprising selecting the second SIM profile using a fixed order SIM profile list.

19. The method of claim 15, wherein the device-specific signature element comprises the device hardware ID and the time stamp.

20. The method of claim 15, further comprising selecting the second SIM profile using an over the air (OTA) SIM profile selection instruction.

* * * * *